(12) United States Patent
Agrawal et al.

(10) Patent No.: US 12,272,176 B2
(45) Date of Patent: *Apr. 8, 2025

(54) MONITORING SYSTEM THAT CAPTURES IMAGE STREAM OF REGIONS OF INTEREST BASED ON IDENTIFIED FACIAL CUES

(71) Applicant: MOTOROLA MOBILITY LLC, Wilmington, DE (US)

(72) Inventors: Amit Kumar Agrawal, Bangalore (IN); Rahul Bharat Desai, Hoffman Estates, IL (US)

(73) Assignee: Motorola Mobility LLC, Chicago, IL (US)

( * ) Notice: Subject to any disclaimer, the term of this patent is extended or adjusted under 35 U.S.C. 154(b) by 418 days.

This patent is subject to a terminal disclaimer.

(21) Appl. No.: 17/708,720

(22) Filed: Mar. 30, 2022

(65) Prior Publication Data

US 2023/0316808 A1 Oct. 5, 2023

(51) Int. Cl.
| | |
|---|---|
| *G06V 40/16* | (2022.01) |
| *G06T 7/20* | (2017.01) |
| *G06V 10/25* | (2022.01) |
| *G06V 40/18* | (2022.01) |
| *G10L 25/63* | (2013.01) |

(52) U.S. Cl.
CPC ............ *G06V 40/174* (2022.01); *G06T 7/20* (2013.01); *G06V 10/25* (2022.01); *G06V 40/18* (2022.01); *G10L 25/63* (2013.01)

(58) Field of Classification Search
CPC ...... G06V 40/174; G06V 10/25; G06V 40/18; G06T 7/20; G10L 25/63
See application file for complete search history.

(56) References Cited

U.S. PATENT DOCUMENTS

| 11,556,174 B1* | 1/2023 | Agrawal | G16H 40/63 |
|---|---|---|---|
| 2012/0075168 A1* | 3/2012 | Osterhout | G06F 3/017 |
| | | | 345/8 |
| 2014/0347265 A1* | 11/2014 | Aimone | G02C 11/10 |
| | | | 345/156 |
| 2016/0360970 A1* | 12/2016 | Tzvieli | A61B 5/0075 |

(Continued)

FOREIGN PATENT DOCUMENTS

WO   WO-2017113974 A1 * 7/2017

*Primary Examiner* — Umair Ahsan
(74) *Attorney, Agent, or Firm* — Isidore PLLC

(57) ABSTRACT

A monitoring system incorporates, and method and computer program product provide a monitoring system that captures image stream of regions of interest based on identified facial cues of a person. A controller of the monitoring system receives a first image stream that encompasses a face of a person and a second image stream that encompasses surrounding object(s) and surface(s) viewable by the person. The controller detects a facial expression of the face. In response to determining that the facial expression is a mood associated expression, the controller determines, from the first image stream, an eye gaze direction of the person. The controller determines a region of interest (ROI) aligned with the eye gaze direction. The controller captures the second image stream and identifies an object contained within the ROI. The controller communicates a notification including the expression and the object within the ROI to an output device.

19 Claims, 8 Drawing Sheets

(56) References Cited

U.S. PATENT DOCUMENTS

| | | | |
|---|---|---|---|
| 2017/0213190 A1* | 7/2017 | Hazan | G06F 16/951 |
| 2017/0251163 A1* | 8/2017 | Ochiai | G06V 20/59 |
| 2019/0348037 A1* | 11/2019 | Khullar | G10L 15/26 |
| 2021/0065407 A1* | 3/2021 | Trim | G06V 10/44 |
| 2021/0287697 A1* | 9/2021 | Marti | G10L 25/63 |
| 2022/0101612 A1* | 3/2022 | Palangie | G06V 10/143 |

* cited by examiner

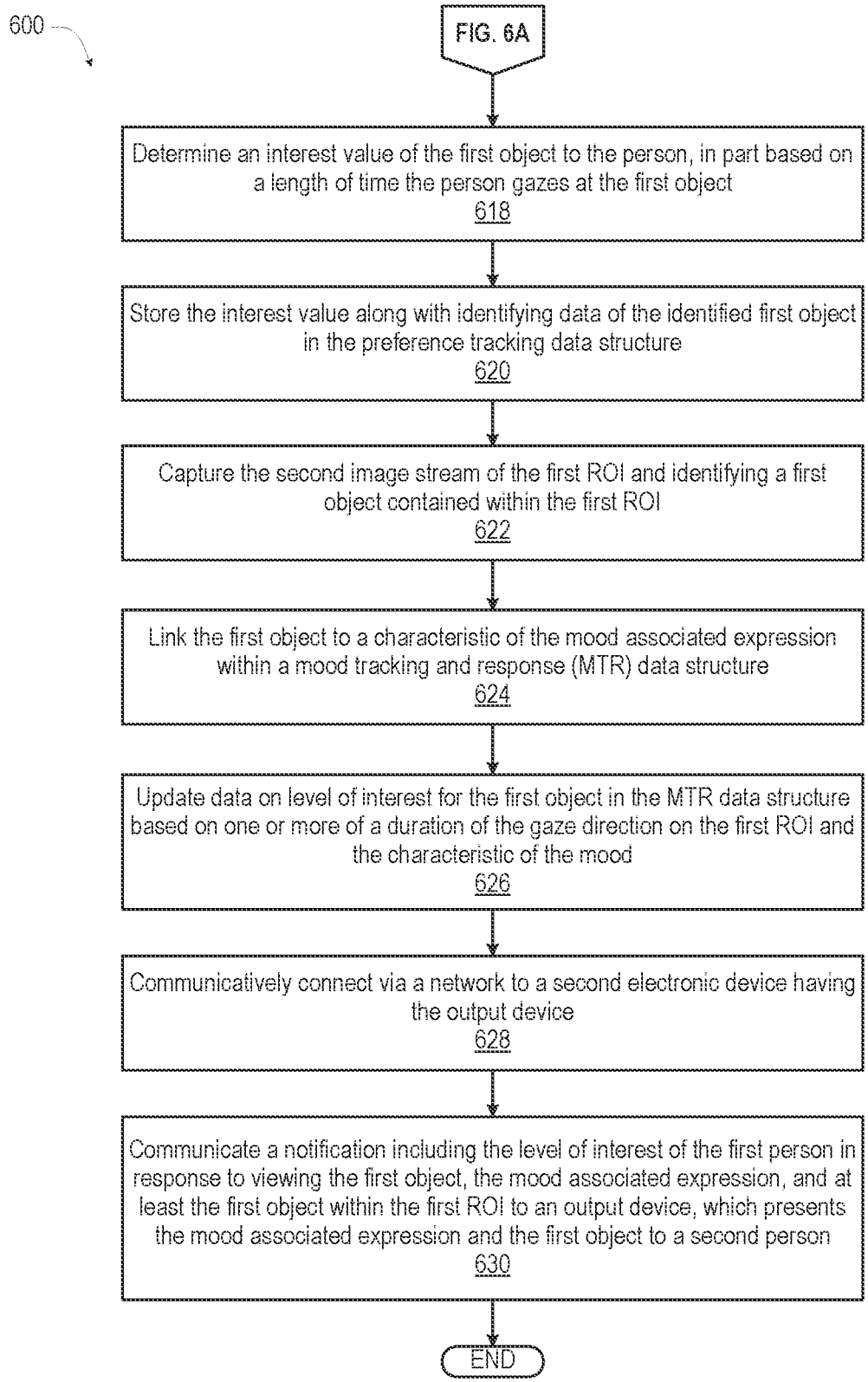

MONITORING SYSTEM THAT CAPTURES IMAGE STREAM OF REGIONS OF INTEREST BASED ON IDENTIFIED FACIAL CUES

BACKGROUND

1. Technical Field

The present disclosure relates generally to camera-based monitoring systems that can monitor a person of interest, and more particular to camera-based monitoring systems that detect eye gaze direction of the person.

2. Description of the Related Art

Certain people who are unable to take care of themselves, such as infants, the sick, and those with ambulatory and communication deficits, require regular attention for their safety and/or well-being. A caregiver, such as a parent for an infant, who is responsible for the person is often removed from the person and rely on monitoring systems that allow the caregiver to attend to other activities while being mindful of the person being monitored and/or cared for. The monitoring systems detect at least audio and in some instances video, which are conveyed to the remote caregiver. Although use of the monitoring system allows the caregiver to move away from the cared for person, the monitoring system does not serve the needs of the cared for person nor does the monitoring system handle determining when such service is required. The caregiver has to continually assess the state of the cared-for person by paying attention to the output being locally provided of the audio and/or video captured by the remote monitoring system. If attending to other activities, the caregiver cannot scrutinize the video to understand the nuances of the state of the cared-for person, and the received output does not provide information about objects of interest to and/or objects and images viewable by the cared-for person.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 6A-6B (collectively "FIG. 6") present a flow diagram of a method performed by the monitoring system of FIG. 5 for capturing, based on identified facial cues, image streams of regions of interest that a person is gazing toward, according to one or more embodiments.

DETAILED DESCRIPTION

Figure 1:
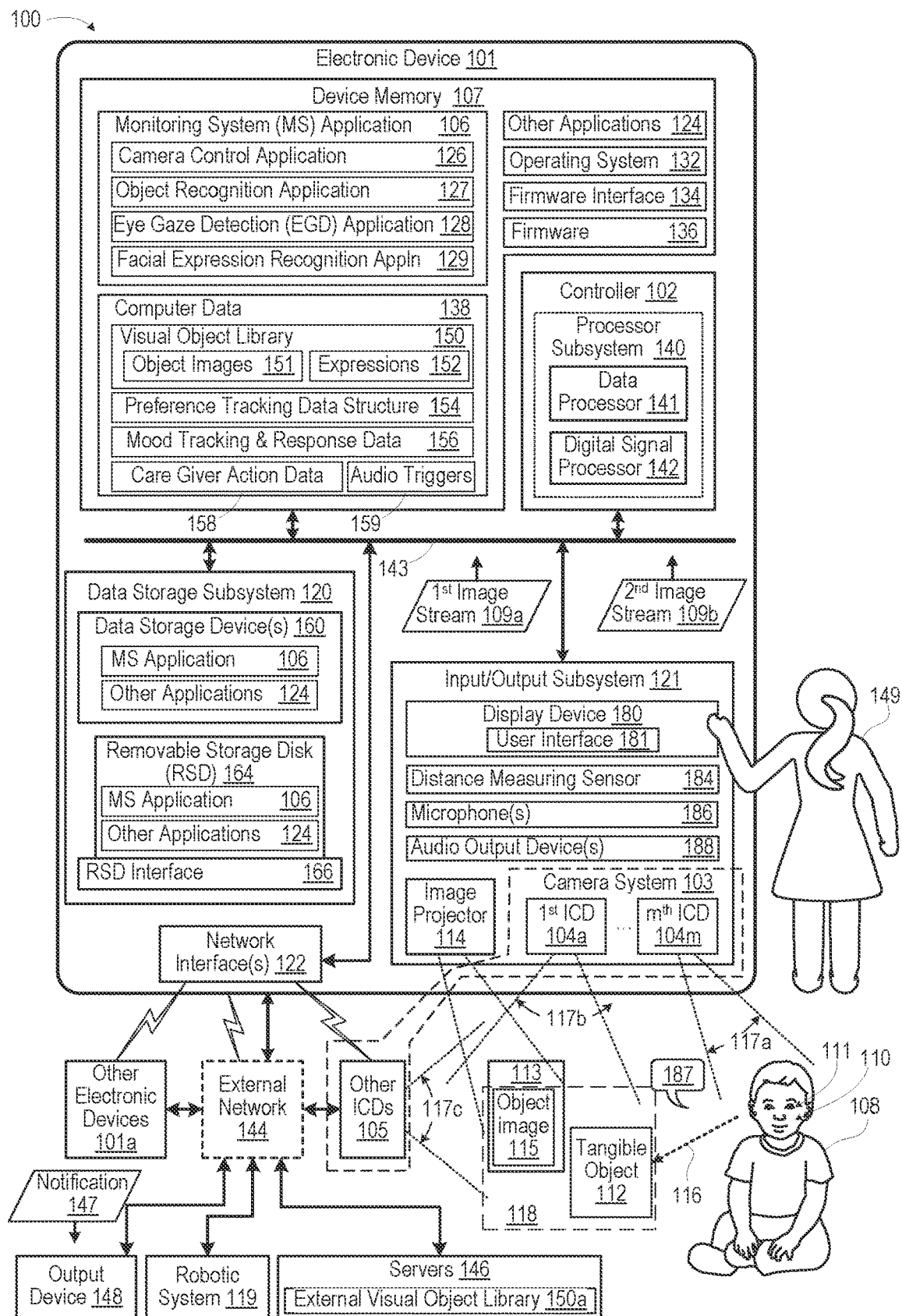
FIG. 1 depicts a functional block diagram of a monitoring system having an electronic device that detects eye-gaze direction of a person and learns about and responds to objects of subjective interest to the person, in part based on eye-gaze direction and duration, according to one or more embodiments.

According to one aspect of the present disclosure, a monitoring system incorporates a method and a computer program product that provides a monitoring system that captures an image stream of regions of interest based on identified facial cues of a person of interest. The monitoring system includes a camera system having at least one image capturing device. The camera system captures a first image stream that encompasses a face of the person of interest and a second image stream that at least partially encompasses one or more surrounding tangible objects and surfaces viewable by the person. A memory of the monitoring system stores (i) a visual object library; (ii) a facial expression recognition application; and (iii) an eye gaze detection (EGD) application. A controller is communicatively coupled to the camera system and the memory. The controller triggers the facial expression recognition application to detect a facial expression of the face of the first person incorporated in the first image stream. In response to determining that the facial expression is a mood associated expression, the controller triggers the EGD application to determine, from the first image stream, an eye gaze direction of the first person. The controller determines a first region of interest (ROI) that is aligned with the eye gaze direction. The controller captures the second image stream of the first ROI and identifies a first object contained within the first ROI. The controller communicates a notification including the mood associated expression and at least the first object to an output device, which presents the mood associated expression and the first object to a second person.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of an example of monitoring system 100 that includes at least one electronic device 101 in an operating environment within which the features of the present disclosure are advantageously implemented. In particular, controller 102 of electronic device 101 is communicatively coupled to camera system 103 having one or more image capturing devices (ICDs) 104a-104m. Camera system 103 can also include other detached ICDs 105 that are external to electronic device 101. Controller executes monitoring system application 106 in device memory 107 to configure electronic device 101 as monitoring system 100 for first person 108 of interest, such as an infant, a small child, or an adult with ambulatory and communication deficits. Camera system 103 captures first image stream 109a that encompasses face 110 including eyes 111 of first person 108 of interest and second image stream 109b that at least partially encompasses one or more surrounding tangible objects 118 and surfaces 113 viewable by first person 108. Image projector 114 of electronic device 101 (or provided as a second device of monitoring system) may project object images 115 on surfaces 113 that are within the field of view of (i.e., visible to) first person 108. First person 108 demonstrates interest in tangible objects 118 and/or object images 115 at least in part by the person's eye gaze direction 116. In one or more embodiments, camera system 103 includes more than one ICD 104a-104m and/or detached ICDs 105 and thus is a multi-camera camera system. In an example, $m^{th}$ ICD 104m has a first field of view (FOV) 117a configured to encompass first image stream 109a. First ICD 104a has second FOV 117b configured to encompass second image stream 109b.

According to aspects of the present disclosure, controller 102 determines locations of both tangible objects 118 and object images 115 on surface 113 that have a respective physical location and that are visible to first person 108. For simplicity, tangible objects 118 and object images 115 are collectively referred to as objects 115/118. Controller 102 monitors eye gaze direction 116 of first person 108 to detect interest and disinterest in each object 115/118, whether tangible object 112 or object image 115. In one or more embodiments, such as during the process of learning interests of first person 108, controller 102 may only monitor eye gaze direction 116 with regard to tangible objects 118. In one or more embodiments, controller 102 may project all object images 115 of interest to first person 108. Although similarly analyzed for subject interest, controller 102 treats tangible objects 118 and object images 115 differently in other embodiments of the present disclosure. For example, controller 102 may periodically scan for tangible objects 118 that may be manually positioned within view of first person 108. In one or more embodiments, controller 102 is communicatively coupled to robotic systems 119 that manipulate tangible objects 118 for purposes such as moving tangible objects 118 into view of first person 108 or positioning tangible objects 118 for use by first person 108 responsive to detected interest. Controller 102 may perform other activities for object images 115. Controller 102 scans for portions of surfaces 113 that are unobstructed and smooth as candidate regions for receiving a projection of particular object images 115.

In one or more embodiments, camera system 103 may include a single ICD and thus be a single camera system rather than a multi-camera system (e.g., including two ICDs 104a-104b that are integral to electronic device 101). In an example, one detached or stand-alone ICD 105 has third FOV 117c configurable to encompass both first image stream 109a and second image stream 109b, simultaneously viewing face 110 and eyes 111 of person 108 as well as objects 118 such as tangible object 112 and/or object image 115. In another example, detached ICD 105 has configurable third FOV 117c configurable in a first direction to encompass first image stream 109a and in a second direction to encompass second image stream 109b, alternating between viewing face 110 and eyes 111 of person 108 and then object 118 located in eye gaze direction 116 of person 108. In one or more embodiments, the ability to configure detached ICD 105 can be enabled with use of a gimbal that enables rotation of the camera lens between at least the first direction and second direction corresponding to first image stream 109*a* and second image stream 109*b*.

Electronic device 101 can be one of a host of different types of devices, including but not limited to, an infant monitoring system, a mobile cellular phone, satellite phone, or smart-phone, a laptop, a net-book, an ultra-book, a networked smart watch, networked sports/exercise watch, and/or a tablet computing device or similar device. As more completed presented within communication device 200 of FIG. 2, described hereafter, electronic device 101 can also be a device supporting wireless communication. In these implementations, electronic device 101 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Most importantly, it is appreciated that the features described herein can be implemented with a display device of various other types of electronic devices that are not necessarily a communication device. The specific presentation or description herein of a mobile communication device in addition to a data processing system as different examples of electronic device 101 are for example only, and not intended to be limiting on the disclosure.

Referring now to the specific component makeup and the associated functionality of the presented components. In one or more embodiments, in addition to device memory 107, electronic device 101 includes data storage subsystem 120, input/output (I/O) subsystem 121, and network interface 122, each of which is managed by controller 102. Device memory 107 includes program code for applications, such as monitoring system application 106 and other applications 124. In one or more embodiments, monitoring system application 106 is a suite of applications, utilities, components, or modules that configure electronic device 101 to monitor first person 108. In an example, monitoring system application 106 includes camera control application 126, object recognition application 127, eye gaze detection application 128, and facial expression recognition application 129. Device memory 107 further includes operating system (OS) 132, firmware interface 134, such as basic input/output system (BIOS) or Uniform Extensible Firmware Interface (UEFI), and firmware 136. Device memory 107 stores computer data 138 that is used by monitoring system application 106.

Controller 102 includes processor subsystem 140, which executes program code to provide operating functionality of electronic device 101. Controller 102 manages, and in some instances directly controls, the various functions and/or operations of electronic device 101. These functions and/or operations include, but are not limited to including, application data processing, communication with second communication devices, navigation tasks, image processing, and signal processing. In one or more alternate embodiments, electronic device 101 may use hardware component equivalents for application data processing and signal processing. For example, electronic device 101 may use special purpose hardware, dedicated processors, general purpose computers, microprocessor-based computers, micro-controllers, optical computers, analog computers, dedicated processors and/or dedicated hard-wired logic.

The software and/or firmware modules executed by processor subsystem 140 have varying functionality when their corresponding program code is executed by data processor(s) 141 or secondary processing devices within electronic device 101 such as digital signal processor 142. Processor subsystem 140 can include other processors that are communicatively coupled internally or externally to data processor 141. Data processor 141 is communicatively coupled, via system interlink 143, to device memory 107, data storage subsystem 120, and network interface 122. System interlink 143 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 143) are illustrated in FIG. 1, it is to be understood that more, fewer, or different interconnections may be present in other embodiments.

Network interface 122 enables electronic device 101 to connect (via wireless or wired connection) to external network 144 and directly/indirectly to other devices such as robotic systems 119. Network 144 provides connection to and can include one or more network servers 146 and can provide connection to other devices such as robotic systems 119. Electronic device 101 is thus able to connect with servers 146 and other devices such as robotic systems 119 to share and/or download application data that can be utilized to implement features of the disclosure. In an example, servers 146 may contain external visual object library 150*a*. Monitoring system 100 may include more than one electronic devices 101 that are communicatively coupled to cooperate in independently monitoring separate portions of a room or a different room. Electronic device 101 may communicate notifications 147 to output device 148 used by second person 149. In a broader application, the term "second person" 149 may refer to a human being, a robot, a support machine, or a customer service dispatch system, in different embodiments. In one or more embodiments, network interface 122 of communication device 200 includes a network connection such as an Ethernet receptacle that connected by a network cable to a wired area network. Network interface 122 can support one or more network communication protocols such as a local area network (LAN), a campus area network (CAN), a metropolitan area network (MAN), or a wide area network (WAN).

Processor subsystem 140 of controller 102 can execute program code of monitoring system application 106 to configure electronic device 101 to perform specific functions that use or create computer data 138. In an example, computer data 138 includes visual object library 150 having stored object images 151 and facial expressions 152. Computer data 138 also may include preference tracking data structure 154, mood tracking and response (MTR) data structure 156, caregiver action data 158, and audio trigger data 159. These various data are referenced and updated by monitoring system application 106.

Data storage subsystem 120 of electronic device 101 includes data storage device(s) 160. Controller 102 is communicatively connected, via system interlink 143, to data storage device(s) 160. Data storage subsystem 120 provides applications, program code, and stored data on nonvolatile storage that is accessible by controller 102. For example, data storage subsystem 120 can provide a selection of applications and computer data, such as monitoring system application 106 and other application(s) 124. These applications can be loaded into device memory 107 for execution by controller 102. In one or more embodiments, data storage device(s) 160 can include hard disk drives (HDDs), optical disk drives, and/or solid-state drives (SSDs), etc. Data storage subsystem 120 of electronic device 101 can include removable storage device(s) (RSD(s)) 164, which is received in RSD interface 166. Controller 102 is communicatively connected to RSD 164, via system interlink 143 and RSD interface 166. In one or more embodiments, RSD 164 is a non-transitory computer program product or computer readable storage device. Controller 102 can access RSD 164 or data storage device(s) 160 to provision electronic device 101 with program code, such as code for monitoring system application 106 and other application(s) 124, and with computer data 138 such as visual object library 150.

In addition to ICDs 104a-104m and image projector 114, I/O subsystem 121 includes display device 180 that presents user interface 181 for use by second person 149 when in the room with monitoring system 100. Second person 149 may also remotely control or view output from monitoring system 100 via output device 148 In one or more embodiments, ICDs 104a-104m provide three-dimensional data or are augmented by distance measuring sensor 184 to assist in determining relative locations of first person 108, objects 118 and surfaces 113. Controller 102 can then use eye gaze direction 116 of first person 108 to identify regions of interest (ROI) to first person 108. I/O subsystem 121 includes microphone(s) 186 that can be used to receive audio input 187 from first person 108, such as sounds of crying, giggling, laughing, and talking, which, in addition to or in conjunction with facial expressions, indicate a mood of first person 108. I/O subsystem 121 includes audio output device(s) 188 that may produce soothing sounds or communication from other devices such as robotic systems 119.

In one aspect of the present disclosure, electronic device 101 includes camera system 103, which includes at least one image capturing device (103a-104m, 105) and which captures first image stream 109a that encompasses face 110 of first person 108 of interest and second image stream 108b that at least partially encompasses one or more surrounding tangible objects 112 and surfaces 113 viewable by first person 108. Device memory 107 stores: (i) EGD application 128; (ii) facial expression recognition application 129; and (iii) visual object library 150. Controller 102 is communicatively coupled to camera system 103 and device memory 107. Controller 102 triggers facial expression recognition application 129 to detect a facial expression of face 110 of first person 108 incorporated in first image stream 109a. In response to determining that the facial expression is a mood associated expression, controller 102 triggers EGD application 128 to determine, from first image stream 109a, eye gaze direction 116 of first person 108. Controller determines a first ROI that is aligned with eye gaze direction 116. Controller 102 captures second image stream 109b of first ROI and identifies first object 118 contained within the first ROI. Controller 102 generates and communicates notification 147 including the mood associated expression and at least first object 118 to output device 148, which presents the mood associated expression and first object 118 to second person 149.

Figure 2:
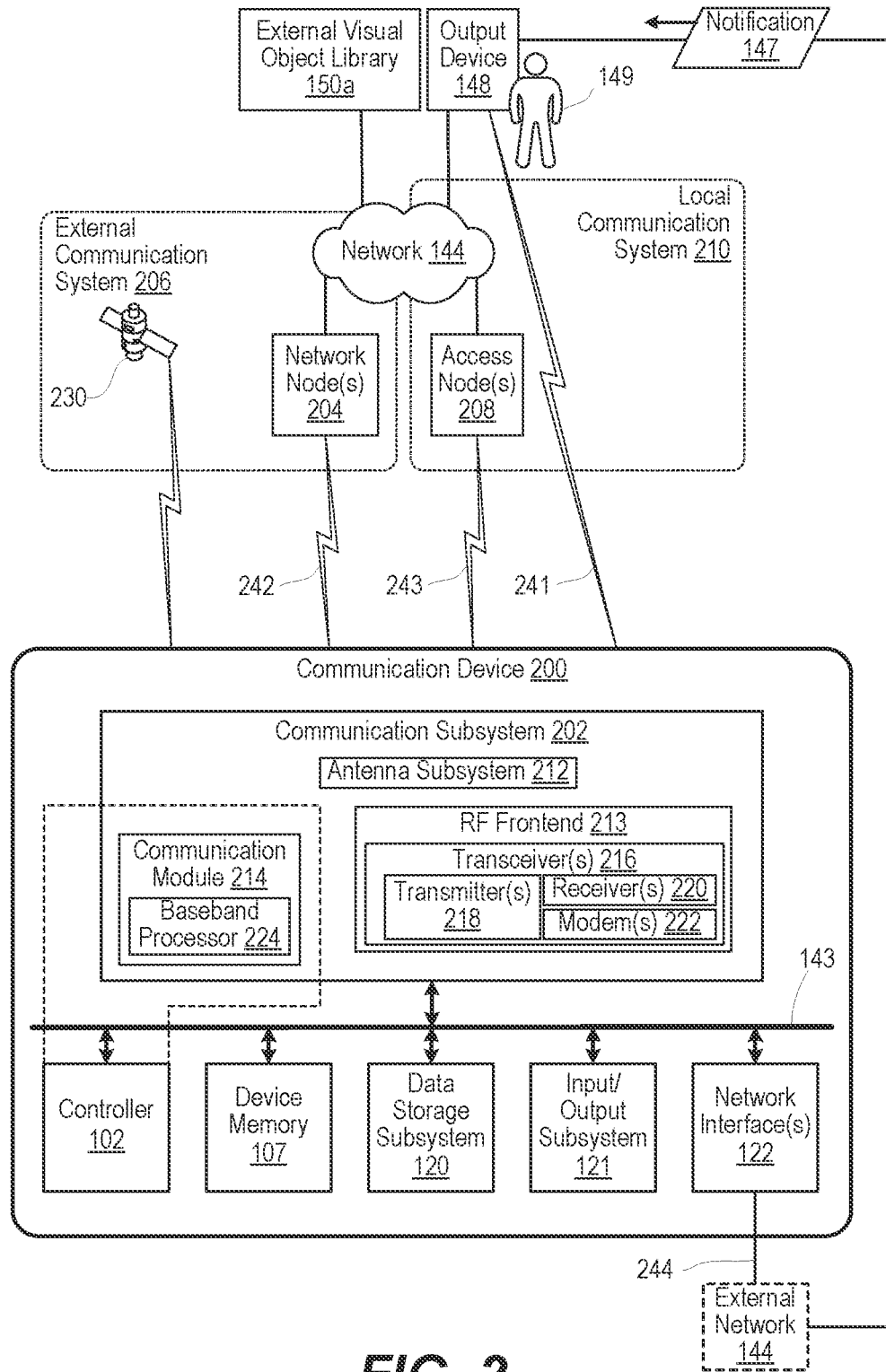
FIG. 2 depicts a functional block diagram of a monitoring system having a communication device that performs learning and notification functions based on detected eye-gaze direction of a person in an operating environment within which the features of the present disclosure are advantageously implemented, according to one or more embodiments.

FIG. 2 is a functional block diagram of communication device 200 in an operating environment within which the features of the present disclosure are advantageously implemented. Communication device 200 is an implementation of electronic device 101 (FIG. 1), including controller 102, device memory 107, data storage subsystem 120, I/O subsystem 121, and network interface(s) 122. Communication device 200 further includes communication subsystem 202 for communicating, using a cellular connection, with network node(s) 204 of external communication system 206 and for communicating, using a wireless connection, with access node(s) 208 of local communication system 210. Communication subsystem 202 includes antenna subsystem 212. Communication subsystem 202 includes radio frequency (RF) front end 213 and communication module 214. RF front end 213 includes transceiver(s) 216, which includes transmitter(s) 218 and receiver(s) 220. RF front end 213 further includes modem(s) 222. Communication module 214 of communication subsystem 202 includes baseband processor 224 that communicates with controller 102 and RF front end 213. Baseband processor 224 operates in a baseband frequency range to encode data for transmission and decode received data, according to a communication protocol. Modem(s) 222 modulate baseband encoded data from communication module 214 onto a carrier signal to provide a transmit signal that is amplified by transmitter(s) 218. Modem(s) 222 demodulates each signal received from external communication subsystem 202 using by antenna subsystem 212. The received signal is amplified and filtered by receiver(s) 220, which demodulate received encoded data from a received carrier signal.

In one or more embodiments, controller 102, via communication subsystem 202, performs multiple types of cellular OTA or wireless communication with local communication system 210. Communication subsystem 202 can communicate via an over-the-air (OTA) connection 241 with output device 148 used by second person 149 ("caregiver"). In an example, OTA connection 241 is a peer-to-peer connection, Bluetooth connection, or other personal access network (PAN) connection. In another example, output device 148 is as a smart watch or a wireless headset. In an additional example, output device 148 is a head worn device such as smart glasses, a helmet mounted display (HMD), or visors that present a virtual reality (VR), extended reality (XR), or augmented reality (AR) service. In one or more embodiments, communication subsystem 202 communicates with one or more locally networked devices via a wireless local area network (WLAN) link provided by access node(s) 208. In one or more embodiments, access node(s) 208 supports communication using one or more IEEE 802.11 WLAN protocols. Access node(s) 208 is connected to a wide area network such as the Internet. In one or more embodiments, communication subsystem 202 communicates with GPS satellites 230 to obtain geospatial location information. In one or more embodiments, communication subsystem 202 communicates via network node(s) 204 or access node(s) 204 and external network 144 with external visual object library 150a.

Controller 102 communicates notification 147 to output device 148 for presenting to second person 149. In one or more embodiments, controller communicates with output device 148 via OTA connection 241 between communication subsystem 202 and output device 148. In one or more embodiments, controller communicates with output device 148 via cellular connection 242 between communication subsystem 202 and base node 204. In one or more embodiments, controller communicates with output device 148 via wireless connection 243 between communication subsystem 202 and access node 208. In one or more embodiments, controller communicates with output device 148 via wired connection 244 between network interface 122 and external network 144.

Figure 3:
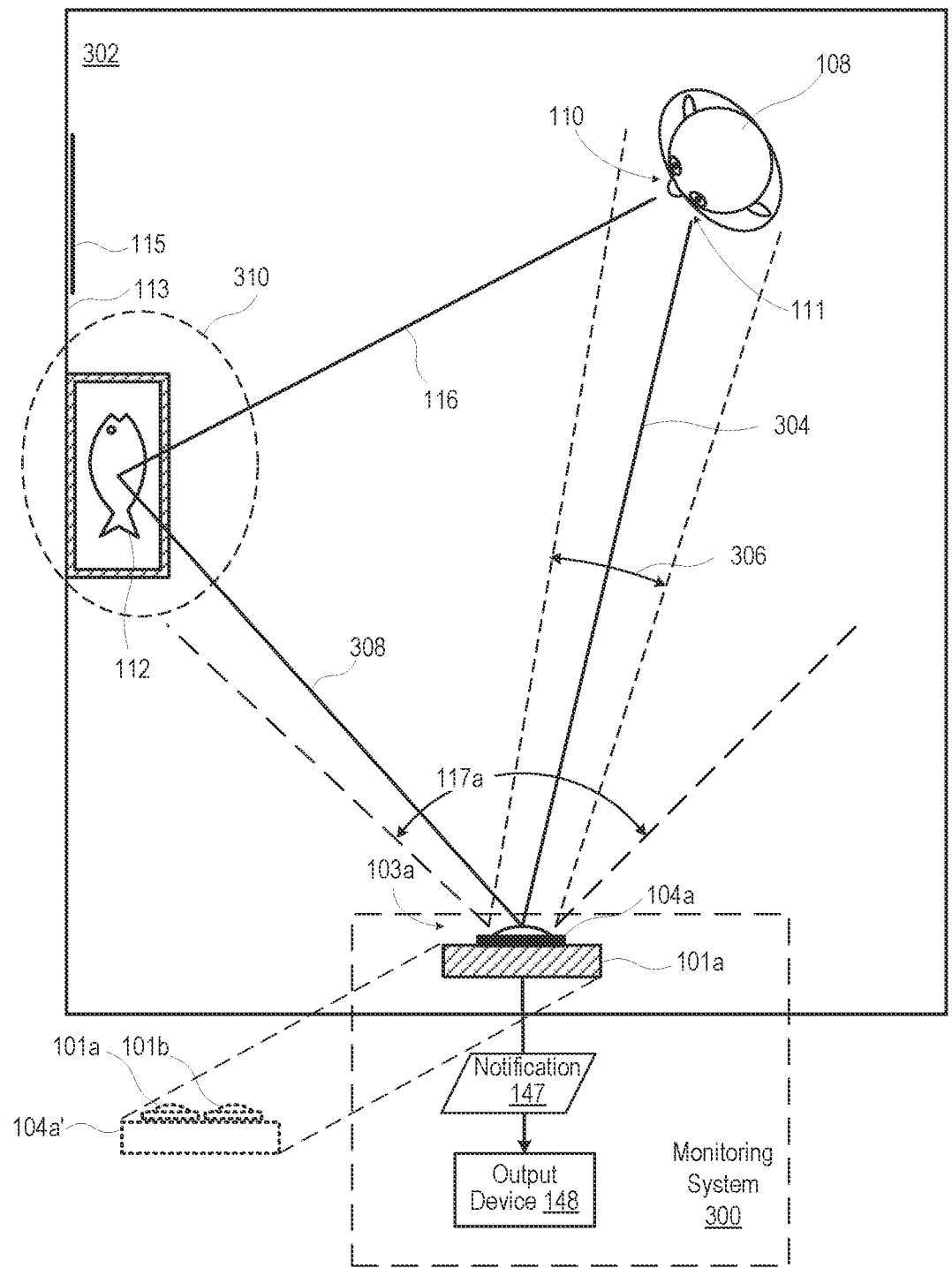
FIG. 3 is a top view diagram of a monitoring system provided by the electronic device of FIG. 1 or the communication device of FIG. 2 having a single camera system with one image capturing device (ICD) positioned to monitor a person and objects of interest to the person in a surrounding space viewable within the field of view of the single camera system, according to one or more embodiments.

FIG. 3 is a top view diagram of monitoring system 300 provided by single electronic device 101a having single camera system 103a with one ICD 104a positioned to monitor first person 108 in room 302. Monitoring system 300 includes output device 148 that is outside of room 302 and that receives notification 147. ICD 104a is positioned and controlled to have FOV 117a that simultaneously encompasses face 110 and eyes 111 of person 108 (first image stream 109a of FIG. 1) and also object 118 (second image stream 109b of FIG. 1) that is aligned with eye gaze direction 116 of person 108. For clarity, eye gaze direction 116 is depicted in two-dimension; however, electronic device 101a determines eye gaze direction 116 in three-dimensions based on determining location of first person 108 and orientation of face 110 and eyes 111 of first person 108 to ICD 104. Electronic device 101a determines direction 304 to first person 108 and distance to first person 108 to obtain location. Distance may be based on an apparent angular dimension 306 of first person 108 as viewed by ICD 104a using demographic scaling information for a person. Apparent size changes linearly with distance. Distance may be based on distance detection by distance measuring sensor 184 (FIG. 1). Electronic device 101 also determines direction 308 to location of region of interest (ROI) 310 that is aligned with gaze direction 304. Within ROI 310, electronic device 101a identifies any objects 118 or object images 115 on surfaces 113. In one or more embodiments, first ICD 104a is gimballed to look sequentially at first person 108 and ROI 310.

In one or more embodiments, electronic device 110' includes two ICDs 104a-104b to respectively focus on first person 108 and ROI 310. Controller 102 determines ROI 310 by detecting vertical and horizontal angles of eyes 111 relative to the location of first ICD 104a and then mathematically extrapolating that information in a three-dimensional space (e.g., Cartesian or spherical coordinates) to an area in direct line of sight of eye gaze direction 116, before feeding that information into second camera controller of second ICD 104b to focus the lens on the area that is ROI 301—understanding that second ICD 104b is offset from first ICD 104a and from eyes 111 of first person 108, so the offset position has to be included in the determination of the true ROI.

Figure 4:
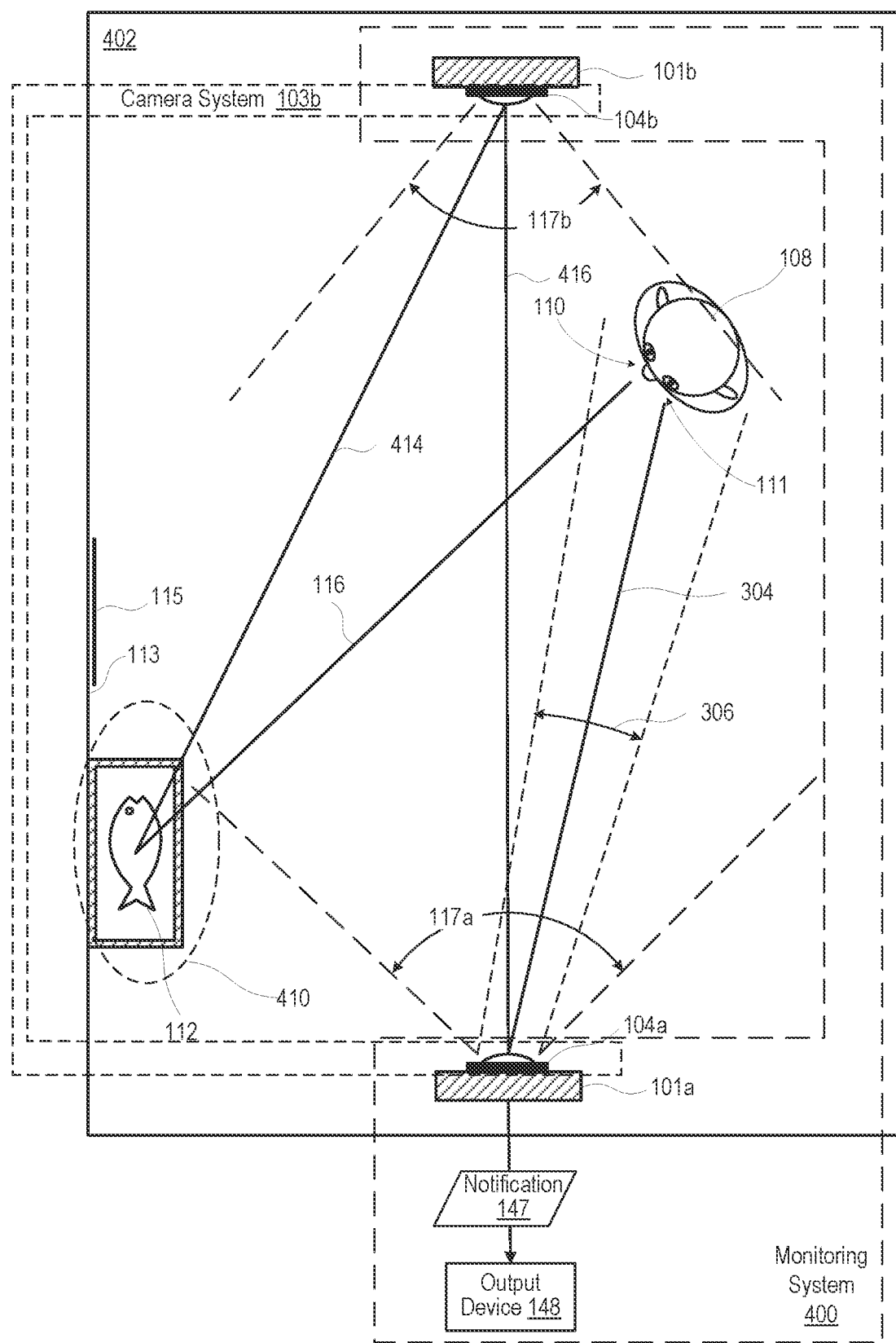
FIG. 4 is a top view diagram of a monitoring system provided by separate camera devices positioned to respectively monitor a person and objects in a surrounding space, according to one or more embodiments.

FIG. 4 is a top view diagram of monitoring system 400 having multi-camera system 103 provided in part by first electronic device 101a with first ICD 104a having FOV 117a positioned to monitor first person 108 in room 402. In particular, ICD 104a is positioned and controlled to have FOV 117 to encompasses face 110 and eyes 111 of person 108, which are presented within first image stream 109a of FIG. 1. Multi-camera system 103b is also provided in part by second electronic device 101b with second ICD 104b having FOV 117b positioned to monitor a space opposed to face of person and within which one or more objects 111 and/or object images can be found or positioned for viewing by person. The space can be in room 402, and objects and/or object images captured within FOV are presented within second image stream 109b of FIG. 1. Monitoring system 400 includes output device 148 that is located outside of room 402 and which receives and presents notification 147. Second electronic device 101b determines direction 414 and distance from second electronic device 101b to object 118. Object 118 in first ROI 310 is aligned with eye gaze direction 116 of person 108. For clarity, eye gaze direction 116 is depicted in two-dimension; however, first electronic device 101a determines eye gaze direction 116 is determined and extrapolated in three-dimensions as described above. In one embodiment, a relative direction 416 and distance between first and second electronic device 101a-101b and person 108 are determined in order to enable the correct extrapolation of eye gaze direction to a region of interest captured by second ICD of second electronic device 101b. In an example, communication signals between first and second electronic device 101a-101b provide indications of direction and distance of each device. In another example, optical analysis between first and second electronic device 101a-101b may be use by controlling processor of monitoring system 400 to determine relative direction and distance. With collaboration of direction and distance information between first and second electronic device 101a-101b and based on determining location of first person 108 and orientation of face 110 and eyes 111 of first person 108 to ICD 104, monitoring system 400 determines that eye gaze direction 116 monitored by electronic device 101a is aligned with a determined first ROI 410 that can be monitored by second electronic device 101b. According to one embodiment, electronic device 101 determines distance and direction 304 to first person 108, defining location of first person 108 relative to electronic device 101. Electronic device 101 also determines direction 308 to location of a region of interest (ROI) 310 that is aligned with gaze direction 304. Within ROI 308, electronic device 101 identifies any objects 118 or object images 115 on surfaces 113.

Figure 5:
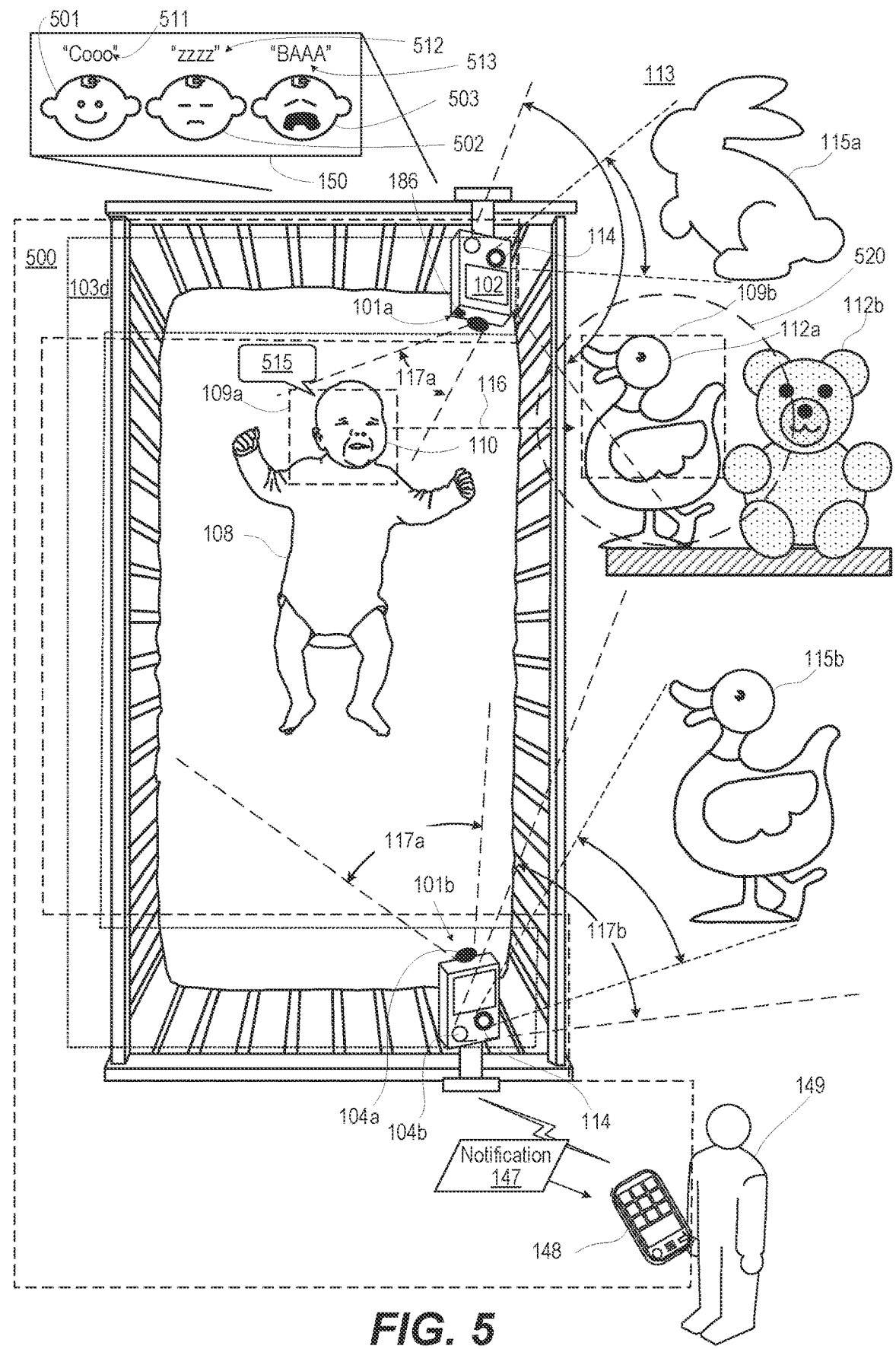
FIG. 5 is a top view of a monitoring system that monitors a first person and tangible objects for facial cues and presents object images on in-view surfaces/space in response to the facial cues, according to one or more embodiments.

FIG. 5 is a top view of monitoring system 500 provided by first and second electronic devices 101a-101b monitoring first person 108, objects 112a-112b and presenting object images 115a-115b on surfaces 113. Each of electronic devices 101a-101b includes multi-camera system 103d having integral first and second ICDs 104a-104b that are positioned on opposite sides respectively of electronic devices 101a-101b. In one or more embodiments, at least one of electronic devices 101a-101b is positioned to independently monitor a portion of a baby crib and at least one of electronic devices 101a-101b includes image projector 114 positioned to present respective object images 115a-115b on surfaces 113. First electronic device 101a has FOV 117a and captures first image stream 109a which encompasses face 110 of first person 108 of interest. In the illustrated embodiment, FOV 117a of first electronic device 101a also enables first electronic device 101a to capture and second image stream 109b that at least partially encompasses one or more surrounding tangible objects 112a-112b and surfaces 113 viewable by first person 108. In one embodiment, second electronic device 101b can include FOV 117b that captures second image stream 109b that at least partially encompasses one or more surrounding tangible objects 112a-112b and surfaces 113 viewable by first person 108 108.

Second person 149 may configure electronic device 101b to project digital image 115b. In one alternate embodiment, a separate projector device is incorporated within monitoring system 500 and controlled by controller 102. Notably, the image stream captured by each of electronic devices 101a-101b can be reversed depending on where person 108 is located within the monitored space. Device memory 107 of first electronic device 101a stores (i) EGD application 128 (FIG. 1); (ii) facial expression recognition application 129 (FIG. 1); and (iii) visual object library 150. Controller 102 is communicatively coupled to camera system 103 and device memory 107. Controller 102 triggers facial expression recognition application 129 (FIG. 1) to detect/identify a facial expression of face 110 of first person 108 presented in first image stream 109a. In an example, visual image library 150 stores at least one positive expression image 501 associated with a positive mood, at least one neutral expression image 502 associated with a neutral mood, and at least one negative expression image 503 associated with a negative mood. Facial expression recognition application 129 (FIG. 1) compares the detected facial expression within first image stream 109a to expression images 501-503 to determine the mood of first person 108. In response to determining that the facial expression detected by facial expression recognition application 129 (FIG. 1) is a mood associated expression, controller 102 triggers EGD application 128 (FIG. 1) to determine, from first image stream 109a, eye gaze direction 116 of first person 108. Controller 102 determines a first ROI that is aligned with eye gaze direction 116. Controller 102 captures second image stream 109b of first ROI and identifies first object 118 contained within the first ROI. Controller 102 communicates notification 147 including the mood associated expression and at least first object 118 within the first ROI to output device 148, which presents the mood associated expression and first object 118 to second person 149. Second person 149 is thus able to understand and/or associate one or more of: (i) what mood is triggered when the first person views the first object 118; or (ii) whether the first person likes or dislikes the first object 118.

In one or more embodiments, visual image library 150 stores at least one positive sound file 511 associated with a positive mood of the first person, at least one neutral sound file 512 associated with a neutral mood, and at least one negative sound file 513 associated with a negative mood. The sound files can be captured contemporaneously with the visual images during a learning process during which MTR data structure 156 is populated. Facial expression recognition application 129 (FIG. 1) may compare audio input 515 received by microphone 186 to sound files 511-513 contemporaneously with matching the facial expression to mood associated expressions to determine the mood of first person 108. Certain moods may be associated with triggers for monitoring system 500 to respond. In one mode, facial expression and sounds may be used to corroborate each other in determining of mood of the first person. In another mode, either the facial expression or the sound may independently trigger a determination of a mood. Controller 102 of electronic device 101a analyzes audio input 515 to determine when audio input 515 incorporates at least one triggering characteristic. In one or more embodiments, controller 102 determines that the facial expression is the mood associated expression based in part on the at least one trigger characteristic. In one or more other embodiments, in response to determining that the audio input 515 is a triggering characteristic, controller 102 triggers facial expression recognition application 129 (FIG. 1) to detect the facial expression of face 110 of first person 108 incorporated in first image stream 109a to confirm or authenticate the mood of first person. As one example in which authentication/corroboration of the person's mood based on facial expression is important, person (e.g., infant) may present audio that sounds like the person is crying (or in discomfort), when the facial expression captured within the first image stream indicates that the person is merely making a crying sound but has a facial expressions that indicates the person is not unhappy or uncomfortable. A response to quieten the person is thus more appropriate than one to sooth the person.

In one or more embodiments, first electronic device 101a selects first object image 115a from preference tracking data structure 154. In one or more embodiments, controller 102 links first tangible object 112a to a characteristic of the mood associated expression within MTR data structure 156. Controller 102 triggers image projector 114 to project first object image 115a within first ROI 520. Controller updates data on level of interest for first tangible object 112a in MTR data structure 156 based on one or more of a duration of eye gaze direction 116 on first ROI 520, frequency of eye gaze direction on first ROI 520, and the characteristic of the mood. Controller 102 incorporates an indication of the level of interest within communicated notification 147 to output device 148.

Figure 6A:
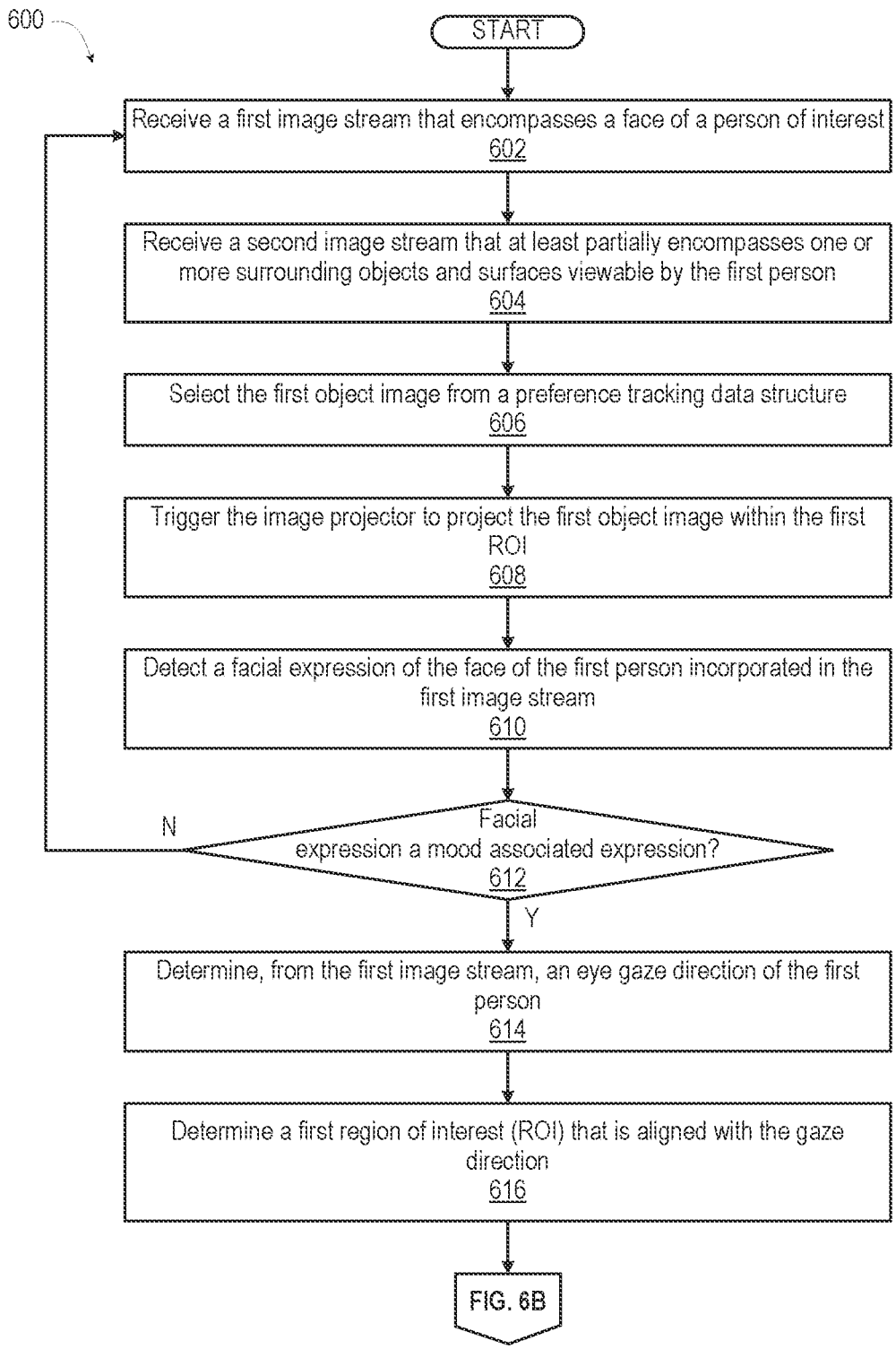
Figure 7:
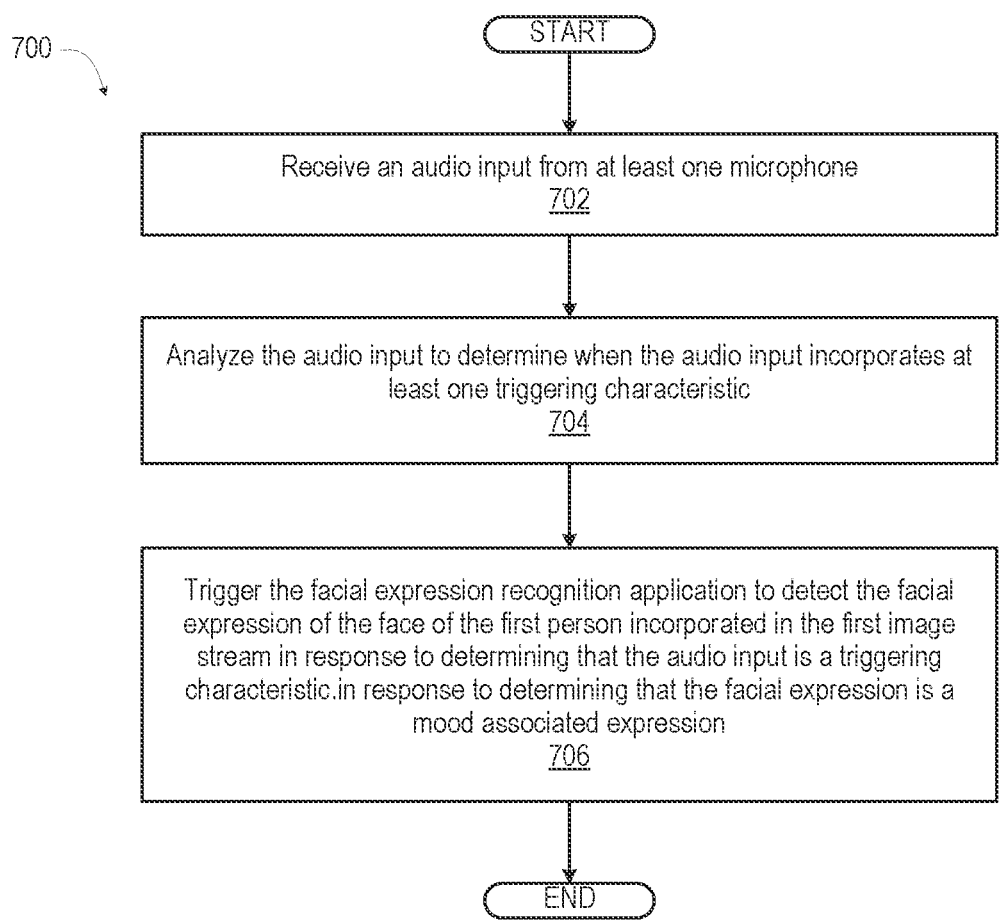
FIG. 7 presents a flow diagram of a method of enhancing or augmenting features of the method of FIGS. 6A-6B for capturing image stream of regions of interest that a person is gazing toward based at least in part on identified audio cues made by the person that corroborate the facial cues or independently indicate a mood of the person, according to one or more embodiments.

FIGS. 6A-6B (collectively "FIG. 6") present a flow diagram of method 600 performed by electronic device 101 (FIG. 1) or communication device 200 (FIG. 2) for capturing image stream of regions of interest that a person is gazing toward based on identified facial cues of a person, indicative of a mood of the person. FIG. 7 presents a flow diagram of method 700 of enhancing or augmenting features for capturing image stream of regions of interest that a person is gazing toward based at least in part on identified audio cues of the person indicative of a mood. The descriptions of methods 600 (FIGS. 6A-6B) and method 700 (FIG. 7) are provided with general reference to the specific components illustrated within the preceding FIGS. 1-5 and specific components referenced in methods 600 (FIGS. 6A-6B) and method 700 (FIG. 7) may be identical or similar to components of the same name used in describing preceding FIGS. 1-5. In one or more embodiments, controller 102 (FIGS. 1-2) configures electronic device 101 (FIG. 1) or communication device (FIG. 2) to provide functionality of method 600 (FIGS. 6A-6B) and method 700 (FIG. 7).

With reference to FIG. 6A, method 600 includes receiving a first image stream that encompasses a face of a person of interest (block 602). Method 600 includes receiving a second image stream that at least partially encompasses one or more surrounding objects and surfaces viewable by the first person (block 604). In one or more embodiments, the first object is an object image. Method 600 includes selecting the first object image from a preference tracking data structure (block 606). Method 600 includes triggering the image projector to project the first object image within the first ROI (block 608). Method 600 includes detecting a facial expression of the face of the first person incorporated in the first image stream (block 610). Method 600 includes determining whether the facial expression is a mood associated expression (decision block 612). In response to determining that the facial expression is not a mood associated expression, method 600 returns to block 602. In response to determining that the facial expression is a mood associated expression, method 600 includes determining, from the first image stream, an eye gaze direction of the first person (block 614). Method 600 includes determining a first region of interest (ROI) that is aligned with the gaze direction (block 616). Then method 600 proceeds to FIG. 6B.

With reference to FIG. 6B, method 600 includes determining an interest value of the first object to the person, in part based on a length of time (duration) or number of times (frequency) that the person gazes at the first object (block 618). Method 600 includes storing the interest value along with identifying data of the identified first object in the preference tracking data structure (block 620). Method 600 includes capturing the second image stream of the first ROI and identifying a first object contained within the first ROI (block 622). Method 600 includes linking the first object to a characteristic of the mood associated expression within a mood tracking and response (MTR) data structure (block 624). Method 600 includes updating data on level of interest for the first object in the MTR data structure based on one or more of a duration and/or frequency of the gaze direction on the first ROI and the characteristic of the mood (block 626). In one or more embodiments, method 600 includes communicatively connecting, via a network, to a second electronic device having the output device (block 628). Method 600 includes communicating, to an output device, a notification that includes the level of interest of the first person in response to viewing the first object, the mood associated expression, and at least the first object within the first ROI, the output device presenting the mood associated expression and the first object to a second person (block 630). Then method 600 ends.

With reference to FIG. 7, method 700 includes receiving an audio input from at least one microphone (block 702). Method 700 includes analyzing the audio input to determine when the audio input incorporates at least one triggering characteristic (block 704). In one or more embodiments, method 700 includes triggering the facial expression recognition application to detect the facial expression of the face of the first person in the first image stream in response to determining that the audio input is a triggering characteristic (block 706). In one or more embodiments, method 700 includes analyzing the first image stream for a facial expression and determining whether the facial expression corresponds to a particular mood associated expression, based in part on identifying the at least one trigger characteristic from the audio input. Then method 700 ends.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation is not limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A monitoring system comprising:
a camera system comprising at least one image capturing device and which captures a first image stream that encompasses a face of a first person of interest and a second image stream that at least partially encompasses one or more surrounding objects and surfaces viewable by the first person;
a memory that stores (i) a visual object library; (ii) a facial expression recognition application; and (iii) an eye gaze detection (EGD) application; and
a controller communicatively coupled to the camera system and the memory, and which:
   detects a facial expression of the face of the first person incorporated in the first image stream;
   determines that the facial expression is a mode associated expression; and
   in response to determining that the facial expression is a mood associated expression:
      determines, from the first image stream, an eye gaze direction of the first person;
      determines a first region of interest (ROI) that is aligned with the eye gaze direction, wherein to determine the first ROI, the controller: detects angles of eyes of the first person relative to a location of the first ICD; and extrapolates the angles of eyes in a 3-dimensional space to an area in direct line of sight of eye gaze direction;
      focuses a lens of the second ICD on the area that is the ROI, using a result of the extrapolation;
      captures the second image stream of the first ROI and identifies a first object contained within the first ROI; and
      communicates a notification including the mood associated expression and at least the first object to an output device, which presents the mood associated expression and the first object to a second person.

2. The monitoring system of claim 1, wherein the camera system is a multi-camera camera system and the at least one image capturing device comprises:
   a first image capturing device having a first field of view (FOV) configured to encompass the first image stream; and
   a second image capturing device having a second FOV configured to encompass the second image stream.

3. The monitoring system of claim 1, wherein the at least one image capturing device has a field of view (FOV) configurable to encompass both the first image stream and the second image stream and is gimballed to look sequentially at the first person and at the ROI.

4. The monitoring system of claim 1, further comprising a network interface that enables the monitoring system to be communicatively connected via a network to a second electronic device having the output device, wherein the controller is communicatively connected to the output device via the network interface and the network.

5. The monitoring system of claim 1, further comprising at least one microphone communicatively coupled to the controller and configured to receive audio input from the first person, wherein the controller:
   receives the audio input from the at least one microphone;
   analyzes the audio input to determine when the audio input incorporates at least one triggering characteristic; and
   triggers the determining of whether the facial expression is the mood associated expression based in part on the audio input incorporating at least one triggering characteristic.

6. The monitoring system of claim 1, further comprising at least one microphone communicatively coupled to the controller and configured to receive audio input from the first person, wherein the controller:
   receives the audio input from the at least one microphone;
   analyzes the audio input to determine when the audio input incorporates at least one triggering characteristic; and
   triggers the facial expression recognition application to detect the facial expression of the face of the first person incorporated in the first image stream in response to determining that the audio input is a triggering characteristic.

7. The monitoring system of claim 1, further comprising an image projector communicatively coupled to the controller, wherein:
   the first object comprises a first object image;
   the memory stores a preference tracking data structure; and
   the controller:
      selects the first object image from the preference tracking data structure; and
      triggers the image projector to project the first object image within the first ROI.

8. The monitoring system of claim 1, wherein:
   the memory stores a mood tracking and response (MTR) data structure; and
   the controller:
      links the first object to a characteristic of the mood associated expression within the MTR data structure;
      updates data on level of interest for the first object in the MTR data structure based on one or more of a duration or a frequency of the eye gaze direction on the first ROI and the characteristic of the mood; and
      incorporates within the communicated notification an indication of the level of interest.

9. The monitoring system of claim 1, wherein:
   the memory stores a preference tracking data structure; and
   the controller:
      determines a level of interest of the first object to the first person, in part based on a length of time or frequency that the first person gazes at the first object;
      stores an interest value along with identifying data of the identified first object in the preference tracking data structure; and
      communicates the notification including the level of interest of the first person in response to the first person viewing the first object.

10. A method comprising:
    receiving a first image stream that encompasses a face of a first person of interest;
    receiving a second image stream that at least partially encompasses one or more surrounding objects and surfaces viewable by the first person;
    detecting a facial expression of the face of the first person incorporated in the first image stream;
    determining that the facial expression is a mode associated expression, at least in part, by comparing the facial expression with expression images within a visual image library; and
    in response to determining that the facial expression is a mood associated expression:
       determining, from the first image stream, an eye gaze direction of the first person;
       determining a first region of interest (ROI) that is aligned with the eye gaze direction, wherein the determining the first ROI comprises: detecting angles of eyes of the first person relative to a location of the first ICD; and extrapolating the angles of eyes in a 3-dimensional space to an area in direct line of sight of eye gaze direction;
       focusing a lens of the second ICD on the area that is the ROI, using a result of the extrapolation;
       capturing the second image stream of the first ROI and identifying a first object contained within the first ROI; and
       communicating a notification including the mood associated expression and at least the first object to an output device, which presents the mood associated expression and the first object to a second person.

11. The method of claim 10, further comprising communicatively connecting via a network to a second electronic device having the output device.

12. The method of claim 10, further comprising:
    receiving an audio input from at least one microphone;
    analyzing the audio input to determine when the audio input incorporates at least one triggering characteristic; and
    determining that the facial expression is the mood associated expression based in part on the audio input incorporating at least one trigger characteristic.

13. The method of claim 10, further comprising:
    receiving audio input from at least one microphone;
    analyzing the audio input to determine when the audio input incorporates at least one triggering characteristic; and
    triggering a facial expression recognition application to detect the facial expression of the face of the first person incorporated in the first image stream in response to determining that the audio input is a triggering characteristic in response to determining that the facial expression is a mood associated expression.

14. The method of claim 10, wherein the first object is a first object image, the method further comprising:
   selecting the first object image from a preference tracking data structure; and
   triggering an image projector to project the first object image within the first ROI.

15. The method of claim 10, further comprising:
   linking the first object to a characteristic of the mood associated expression within a mood tracking and response (MTR) data structure;
   updating data on level of interest for the first object in the MTR data structure based on one or more of a duration or frequency of the eye gaze direction on the first ROI and the characteristic of the mood; and
   incorporating within the communicated notification an indication of the level of interest.

16. The method of claim 10, further comprising:
   determining an interest value of the first object to the first person, in part based on a length of time the first person gazes at the first object;
   storing the interest value along with identifying data of the identified first object in a preference tracking data structure; and
   communicating the notification including a level of interest of the first person in response to viewing the first object.

17. A computer program product comprising:
   a computer readable storage device; and
   program code on the computer readable storage device that when executed by a processor associated with a monitoring system, the program code enables the monitoring system to provide functionality of:
   receiving a first image stream that encompasses a face of a first person of interest;
   receiving a second image stream that at least partially encompasses one or more surrounding objects and surfaces viewable by the first person;
   detecting a facial expression of the face of the first person incorporated in the first image stream;
   determining that the facial expression is a mode associated expression, at least in part, by comparing the facial expression with expression images within a visual image library; and
   in response to determining that the facial expression is a mood associated expression:
     determining, from the first image stream, an eye gaze direction of the first person;
     determining a first region of interest (ROI) that is aligned with the eye gaze direction, wherein the determining the first ROI comprises: detecting angles of eyes of the first person relative to a location of the first ICD; and extrapolating the angles of eyes in a 3-dimensional space to an area in direct line of sight of eye gaze direction;
     focusing a lens of the second ICD on the area that is the ROI, using a result of the extrapolation;
     capturing the second image stream of the first ROI and identifying a first object contained within the first ROI; and
     communicating a notification including the mood associated expression and at least the first object within the first ROI to an output device, which presents the mood associated expression and the first object to a second person.

18. The computer program product of claim 17, wherein the program code enables the monitoring system to provide the functionality of:
   receiving an audio input from at least one microphone;
   analyzing the audio input to determine when the audio input incorporates at least one triggering characteristic; and
   determining that the facial expression is the mood associated expression based in part on the audio input incorporating at least one trigger characteristic.

19. The computer program product of claim 17, wherein the program code enables the monitoring to provide the functionality of:
   receiving audio input from at least one microphone;
   analyzing the audio input to determine when the audio input incorporates at least one triggering characteristic; and
   triggering a facial expression recognition application to detect the facial expression of the face of the first person incorporated in the first image stream in response to determining that the audio input is a triggering characteristic in response to determining that the facial expression is a mood associated expression.

* * * * *